(12) United States Patent
Fu et al.

(10) Patent No.: US 7,602,154 B2
(45) Date of Patent: Oct. 13, 2009

(54) PHASE COMPENSATION DRIVING SCHEME FOR SYNCHRONOUS RECTIFIERS

(75) Inventors: Dianbo Fu, Blacksburg, VA (US); Fred C. Lee, Blacksburg, VA (US)

(73) Assignee: Virginia Tech Intellectual Properties, Inc., Blacksburg, VA (US)

( * ) Notice: Subject to any disclaimer, the term of this patent is extended or adjusted under 35 U.S.C. 154(b) by 245 days.

(21) Appl. No.: 11/749,405

(22) Filed: May 16, 2007

(65) Prior Publication Data
US 2008/0285312 A1 Nov. 20, 2008

(51) Int. Cl.
*H02M 3/335* (2006.01)
(52) U.S. Cl. .................................. 323/21.06
(58) Field of Classification Search .............. 363/16, 363/17, 21.02, 21.04, 21.06, 21.12, 21.14
See application file for complete search history.

(56) References Cited
U.S. PATENT DOCUMENTS 5,552,695 A * 9/1996 Schwartz .................. 323/271
5,991,167 A * 11/1999 Van Lerberghe ............. 363/16
6,072,701 A * 6/2000 Sato et al. .................. 363/17
6,771,521 B1 * 8/2004 Xiong et al. ................. 363/53
7,193,866 B1 * 3/2007 Huang ........................ 363/22

* cited by examiner

*Primary Examiner*—Matthew V Nguyen
(74) *Attorney, Agent, or Firm*—Whitham, Curtis, Christofferson & Cook, P.C.

(57) ABSTRACT

Phase compensation of a voltage appearing on physical terminals of a synchronous rectifier switching element such as a MOSFET is used to substantially eliminate effects of package inductance of the synchronous rectifier and thus approximate the actual voltage across the circuit element providing synchronous rectification in, for example, a switching power converter. By doing so and using the phase compensated signal to control the synchronous rectifier, switching time may be more suitably controlled to improve efficiency of the synchronous rectifier by substantially eliminating body diode conduction and body diode reverse recovery effects.

18 Claims, 5 Drawing Sheets

US 7,602,154 B2

PHASE COMPENSATION DRIVING SCHEME FOR SYNCHRONOUS RECTIFIERS

BACKGROUND OF THE INVENTION

1. Field of the Invention

The present invention generally relates to power converters and, more particularly, to resonant power converters including synchronous rectifiers having driving arrangements to control the switches thereof.

2. Description of the Prior Art

Many familiar electronic device are designed to operate with a power supply providing a substantially constant voltage while power may ultimately be derived from alternating current distribution systems or batteries at a different voltage. Therefore, power conversion arrangements are generally required as power supplies for such devices. Since power supply circuitry to provide a required voltage does not otherwise contribute to the function of the device to which power is supplied, there is a strong incentive to minimize the size and cost of such power supplies.

High power density (e.g. low-volume devices capable of supplying a large amount of power) power converters must be of very high efficiency since any losses in the power converter must be dissipated from the low volume and surface of the power converter, itself. Such power converters must also be of high performance to accommodate large changes in load current such as between idle and active power states of a digital processor with acceptable transient response. Applications such as on-board distributed power systems have increased interest in development of power converter densities which exceed 50 Watts per cubic inch and have shifted circuit design emphasis to high frequency (e.g. above 1 MHZ) resonant topologies for practical embodiments of which, efficiencies approaching 90% are required.

While diodes have been used in the past in power converter designs, power MOSFETs have much lower forward voltage drop than, for example, Schottky diodes and thus draw less power. Thus, synchronous rectification, where a transistor is controlled to conduct at approximately the periods that a diode would conduct, has become a design of choice for such applications. However, for a synchronous rectifier (SR) to exhibit an advantage over a Schottky diode, very precise control over the switching control waveform (and thus switching times) is required in order to obtain advantageously reduced switching losses.

Unlike pulse width modulated switching converters which have also been used in such applications, the turn-on times of switches on the primary side of the power converter circuit and the turn-on times of switches in the SR on the secondary side of the circuit are not exactly in phase for resonant converters and thus cannot use the same driving signal for control of conduction times. Otherwise, the SR would conduct recirculating energy, namely a reverse current from the load to the source; thus causing much increased RMS currents and causing efficiency to deteriorate dramatically. So-called reverse recovery losses are due to a component of such reverse current and result from non-ideal diode behavior of switching elements, whether constituted by diodes or the body diode of a transistor such as a MOSFET. Therefore, some different driving arrangement for the SR is required in some types of power converters.

For some types of resonant converters such as parallel resonant converters and series-parallel resonant converters, the transformer winding voltage may be used to drive the SR. However, for other types of synchronous rectifiers such as those in series resonant converters and LLC resonant converters, exemplary circuits of which are illustrated in FIGS. 1 and 2, respectively, the polarity of the voltage on the secondary winding can change only after the SR is turned off. In other words, when the SR is on, the voltage on the secondary winding of a transformer or autotransformer is clamped to the output voltage and thus cannot change polarity before the SR is turned off and, as a result, the voltage on the secondary winding cannot be used to control the SR (e.g. the SR must be controlled prior to the change in polarity on the transformer secondary).

To solve this problem, it has been proposed to utilize the leakage inductance of the transformer to reshape the terminal voltage of the transformer secondary in order to derive a signal to drive the SR. However, due to additional voltage stress caused by such an arrangement, such a solution is only suitable for power converter structures having a very low voltage output, usually limited to a very few volts. Further, such an arrangement is strongly dependent on di/dt effects.

It has also been proposed to use transformer secondary currents for SR control drive signals: when the body diode of the SR conducts, the SR is turned on and when the current becomes zero or becomes negative, the SR is turned off. However, this proposed SR control scheme suffers from the obvious drawbacks that a current transformer is awkward to incorporate into a power converter (due to its size) and leads to increased size and cost while its insertion inductance greatly compromises high frequency performance such as high voltage stress and higher switching losses.

SUMMARY OF THE INVENTION

It is therefore an object of the present invention to provide a synchronous rectifier (SR) control scheme for power converter topologies where the transformer or autotransformer voltage is clamped to the output voltage when the SR is conductive which is simple and of low cost, complexity and size and which limits body diode conduction, is operable at high switching frequencies and in which reduced reverse recovery losses, low voltage stress and low loss operation of the SR are achieved.

In order to accomplish these and other objects of the invention, a power converter is provided including a power stage including a synchronous rectifier, and a drive arrangement for the synchronous rectifier including a phase compensation circuit developing a signal corresponding to a voltage drop across the synchronous rectifier from a voltage on a physical terminal of the synchronous rectifier; which voltage on the physical terminal of the synchronous rectifier includes effects of package inductance of the synchronous rectifier.

In accordance with another aspect of the invention, an apparatus is provided including, in combination, a circuit element functioning as a synchronous rectifier, and a phase compensation network connected in parallel with the circuit element and arranged to compensate for package inductance effects of the circuit element, wherein the circuit element is controlled in response to an output of the phase compensation circuit.

In accordance with a further aspect of the invention, a method of controlling a switching rectifier is provided comprising steps of detecting a waveform across physical terminals of the synchronous rectifier, compensating phase of the waveform to provide a phase compensated waveform, and controlling conduction of the synchronous rectifier in accordance with the phase compensated waveform.

BRIEF DESCRIPTION OF THE DRAWINGS

The foregoing and other objects, aspects and advantages will be better understood from the following detailed description of a preferred embodiment of the invention with reference to the drawings, in which:

FIGS. 11 and 12 are LLC resonant converter waveforms without and with the phase compensation in accordance with the invention, respectively, to indicate meritorious effects of the invention.

DETAILED DESCRIPTION OF A PREFERRED EMBODIMENT OF THE INVENTION

Figure 1:
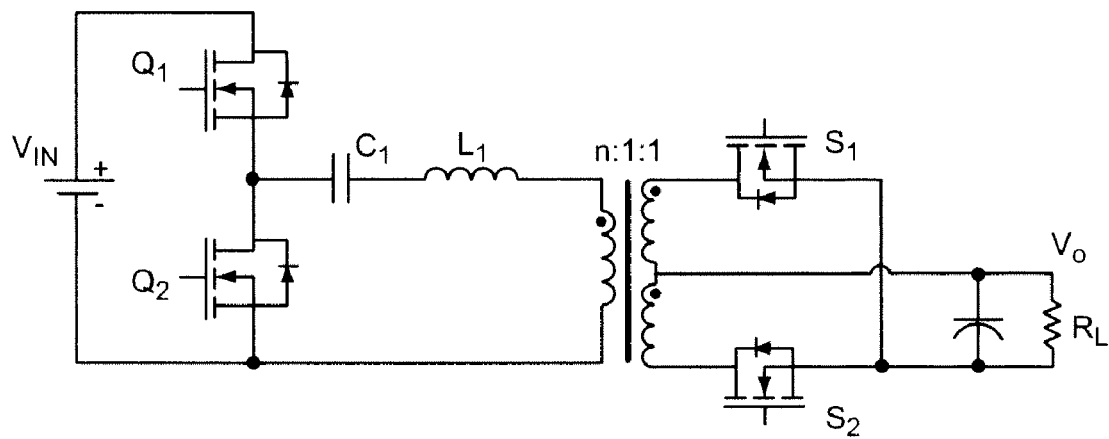
FIGS. 1 and 2 are schematic diagrams of exemplary resonant power converter circuits to which the invention is particularly applicable.
Figure 2:
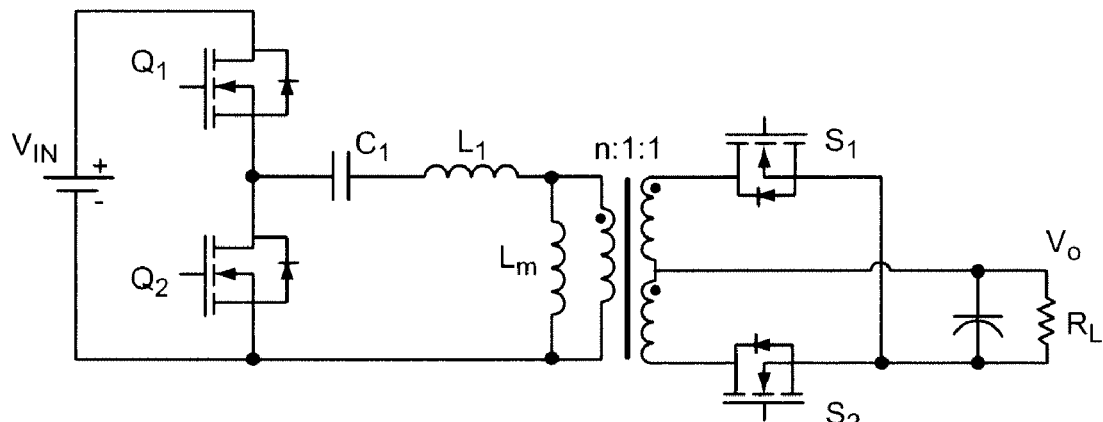

Referring now to the drawings, and more particularly to FIGS. 1 and 2, there is shown two exemplary resonant power converter circuits (a series resonant converter and an LLC resonant converter respectively) including synchronous rectifiers (SR) in which the voltage on the transformer secondary is clamped by the output voltage when the SR is conductive. Therefore, as alluded to above, the voltage at the transformer secondary cannot be directly used to control the SR of the respective resonant power converter circuits. Accordingly, the invention is particularly applicable and advantageous when employed in these and other resonant power converter circuits having a similar characteristic. It should be understood that while some such circuits are known and the invention is not directly illustrated therein (since no control of the SR is illustrated), no portion of either FIG. 1 or FIG. 2 is admitted to be prior art in regard to the present invention because these Figures are arranged to illustrate circuits having the above-noted characteristic whereby these and other types of power converter circuits to which the invention is most applicable and advantageous can be readily identified by those skilled in the art in view of this description of the invention.

Figure 3:
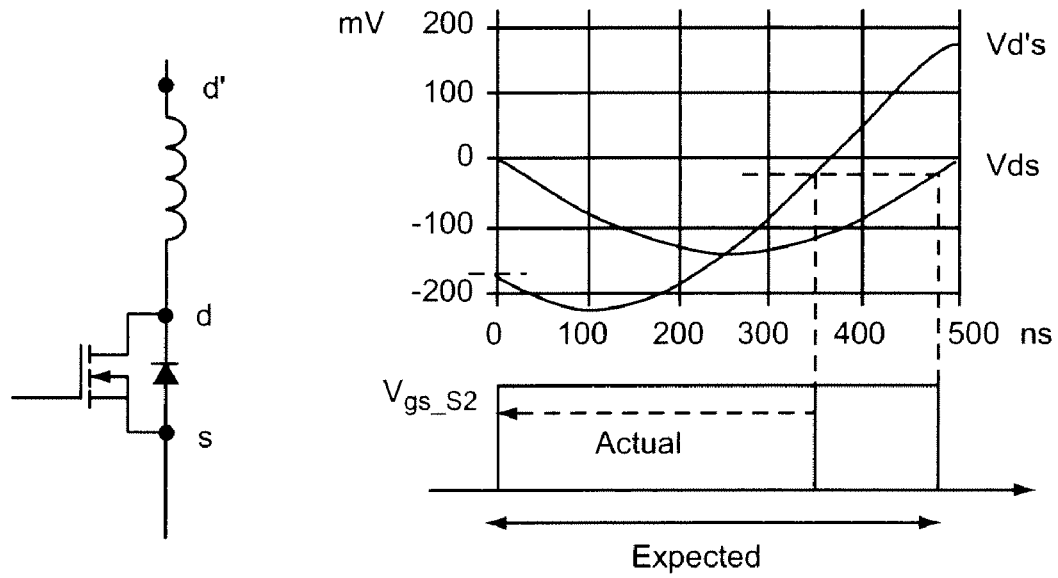
FIG. 3 shows a comparison of actual and expected voltages for control of an SR in circuits such as those of FIGS. 1 and 2, FIG. 4 graphically depicts duty cycle vs switching frequency and load for different SR package inductances.

The invention, in principle, seeks to sense the drain to source voltage, Vds, of the (MOSFET) transistors forming the SRs of circuits such as those depicted in FIGS. 1 and 2. The sensed Vds is then processed by control circuits to determine the level of the current in the transistors and the SR transistors can be switched in close proximity to the zero current transition. With current integrated circuit technology and proper noise immunity layout which will be evident to those skilled in the art, a precise voltage range for switching at approximately one millivolts can, in theory, be achieved without difficulty. However, it has been found by the inventors that the accuracy of such a driving scheme is highly affected by the unavoidable package inductance of MOSFETS or other transistors suitable for use in SRs. Due to the inevitable package inductance of commercially available or theoretically possible transistor designs, the sensed drain to source voltage available at the terminals (or even internally) of such transistors is actually the sum of the internal transistor voltage drop and the package inductance voltage drop, hereinafter indicated by Vd's. As shown in FIG. 3, it is clear that the sensed Vd's of the SR terminal is much different from the actual Vds of, for example, a MOSFET.

Specifically and most importantly, the SR drive signal so derived is much shorter than the expected value which clearly indicates a component of Vd's in addition to Vds and which is attributed by the inventors to package inductance of the MOSFET used as the SR. (The package inductance of a circuit element as used herein should be understood to include not only the inductance of materials constituting the physical packaging of the circuit element such as leads and internal connections but also the inductance of the semiconductor structure of the circuit element.) As shown in greater detail in FIG. 7, the phase and magnitude of sensed Vd's are deviated from the actual Vds. Such differences due to package inductance are further deteriorated for high frequency operation.

Figure 4:
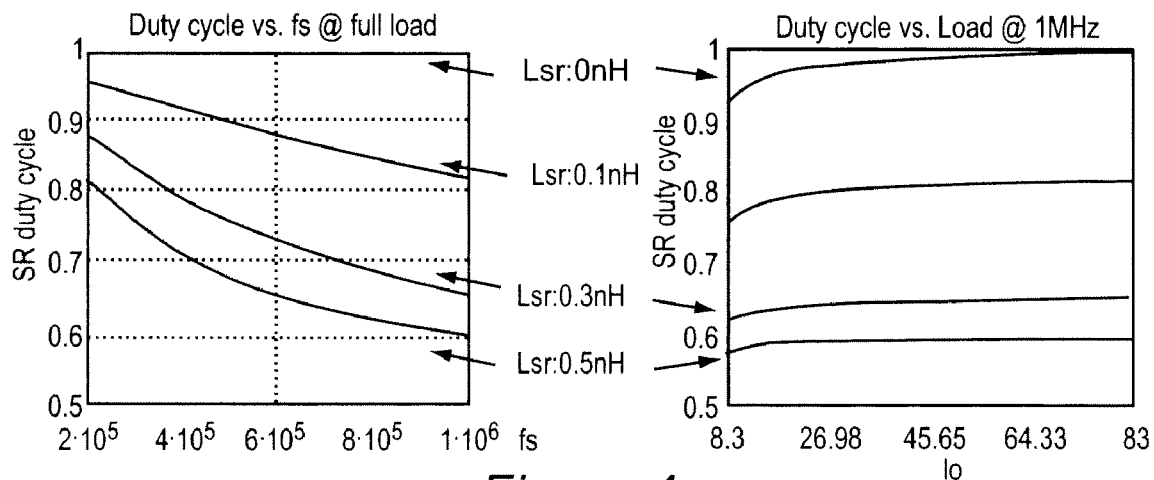

The inventors have also found that the package inductance of commercially available MOSFETs can be highly variable. A commercially available MOSFET from DirectFet™ (a registered trademark of International Rectifier Corporation, 233 Kansas St. El Segundo, Calif. 90245) has been found, through measurements made by the inventors, to have the lowest package inductance of suitable commercially available MOSFETs; which suitability has been confirmed in a 12V output prototype which has been successfully tested. A package inductance (Lsr) of only 0.5 nH has been observed for this compact package. The actual duty cycle versus switching frequency and load for different package inductance values is shown in FIG. 4 from which it is seen that the variance of Vd's from Vds becomes greater with increasing switching frequency and that effect becomes even more pronounced with increasing package inductance (Lsr). Therefore, the deviation of Vd's from Vds illustrated in FIG. 3 should be understood as a "best case" that is practical at the present time and thus the effects of package inductance are quite substantial to the extent that Vd's is not a suitable signal for SR control and that Vds, which is, in fact, suitable for SR control cannot be directly measured or even an approximation thereof derived from Vd's unless the package inductance, Lsr, can be properly compensated in accordance with the invention.

Figure 5:
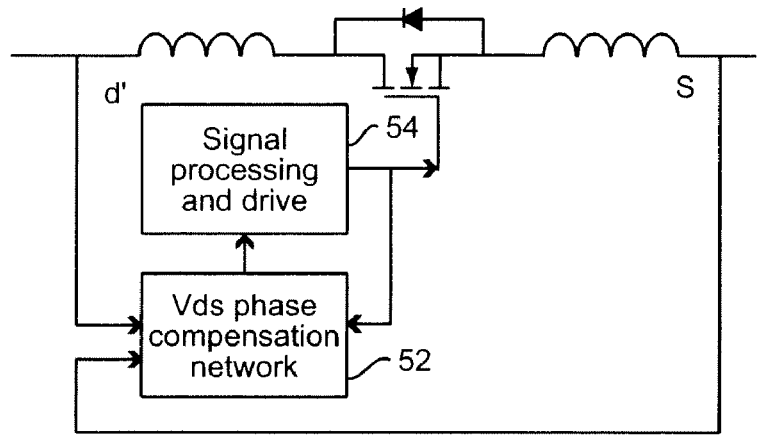
FIG. 5 is a simplified functional block diagram of the SR driving scheme in accordance with the invention.

In order to overcome the problems attributable to package inductance, Lsr, the invention provides a novel phase compensation driving scheme. A block diagram of the proposed circuit is illustrated in FIG. 5. The principal sections are the Vds phase compensation network 52, which will be described in detail below in connection with FIG. 6 and the signal processing and drive stages 54 for the SR. The input signal to the driving circuit 54 is a voltage waveform across the physical terminals of the SR circuit element. (The physical terminals may or may not be internal to the packaging of the circuit element forming the SR and, as noted above, are not the sole cause of package inductance. For example, the size of a MOSFET used as an SR or the connections of a plurality of small MOSFETs connected in parallel to carry sufficient current may also cause significant package inductance to exist; causing Vd's to differ from theoretical Vds sufficiently to cause inefficiency if Vd's is used to control the SR, the difference being compensated in accordance with the invention and the basic principles thereof.)

Based on the analysis discussed above, this voltage on the terminals of the SR is essentially Vd's and cannot be directly used to drive the SR without incurring substantial inefficiency. Thus, in accordance with the invention, an active phase compensation network is used to provide a signal approximating the true (or near-ideal) resistive voltage drop Vds (and which will be referred to as Vds hereinafter if not otherwise qualified by the context of such usage) across the SR as an output of the compensation network. Thus the generated output voltage of the phase compensation network 52, if properly designed, as will be discussed in detail below, reflects exactly (in an ideal case) the conduction period of the SR. The phase compensated Vds, as the output signal of the phase compensation network, is then transferred into the next (signal processing and drive) stage 54 which comprises a set of window comparators, details of which are familiar to those skilled in the art, which convert the input signal into control pulses. The driving circuit utilizes these control pulses to ultimately drive the SR using discrete transistors or integrated circuits which may be specifically developed for the purpose.

Figure 6:
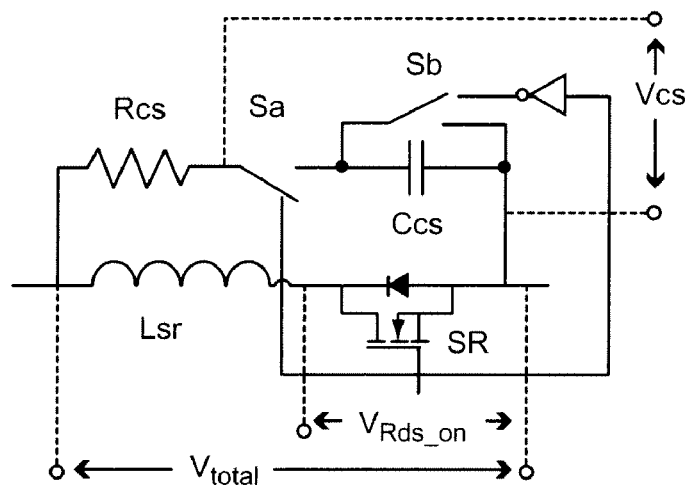
FIG. 6 is a schematic diagram of a preferred embodiment of the Vds phase compensation network forming a portion of FIG. 5 in accordance with the invention.

As alluded to above, a detailed schematic of a preferred embodiment of a suitable active phase compensation network is illustrated in FIG. 6. The main waveforms are plotted in FIGS. 7 and 8, respectively.

Figure 7:
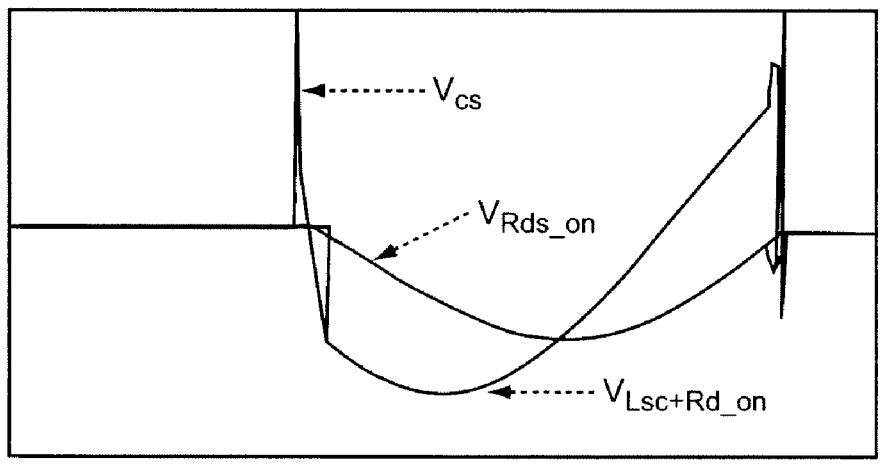
FIGS. 7 and 8 are graphs of waveforms in an equivalent circuit of FIG. 6 when the SR is off and on respectively.

The simulated waveforms with the phase compensation network are illustrated in FIG. 7. $V_{total}$ is the terminal voltage Vd's and $V_{Rds\_on}$ is the actual resistive voltage of SR Vds. Vcs is the compensated voltage for the SR driving scheme. It can be seen that Vcs follows $V_{Rds\_on}$ very well and, in theory, they are identical.

Figure 8:
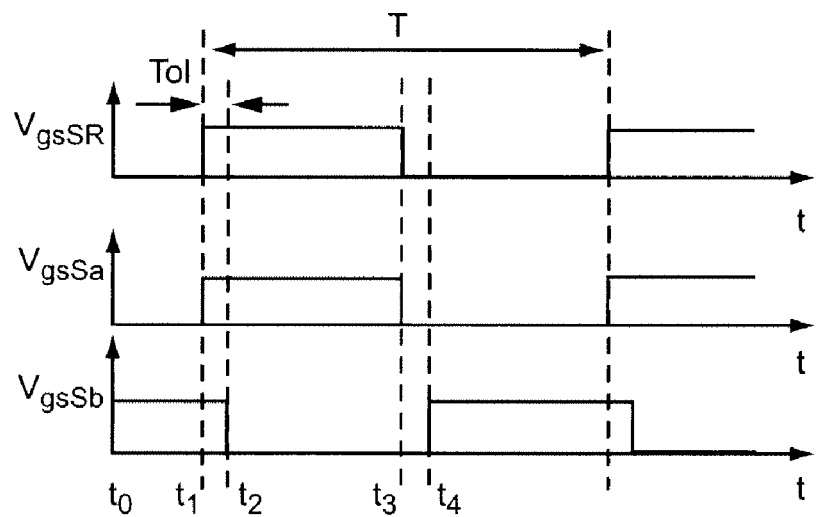
Figure 9:
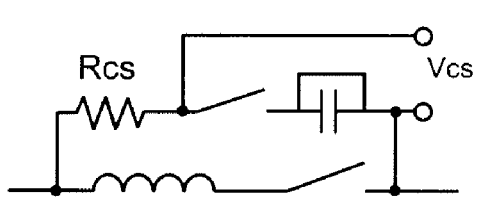
FIGS. 9 and 10 are schematic diagrams of equivalent circuits of FIG. 6 when the SR is off and on, respectively.
Figure 10:
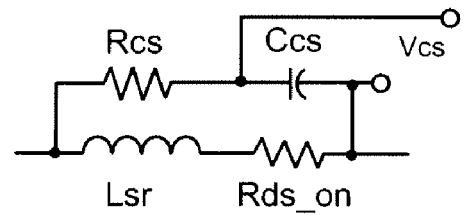

As an example of a suitable phase compensation network, FIG. 6 shows an RC series circuit connected in parallel with the SR device and its series connected package inductance, Lsr. Rcs and Ccs which are preferably connected in series form a passive network in parallel with or shunting the synchronous rectifier to generate a phase compensated voltage $V_{CS}$ at the node at which they are connected. Sa and Sb are small-signal active switches to reset (with non-critical timing) the passive portion of the phase compensation network for each cycle of input signal or operation. As shown in FIG. 8, during the period t0-t1, the SR and Sa are turned off. Since Vcs represents the SR voltage, the compensation network is off/disabled; the equivalent circuit of which is illustrated in FIG. 9. At t1, the voltage across the SR becomes negative and the SR is immediately turned on, as is Sa. The short period t1-t2 (when Sb is turned off, completing a reset operation and establishing a reset mode) guarantees the full turn on of SR and eliminates adverse effects of oscillation. During t2-t3, Sb remains turned off and the phase compensation network provides Vcs which corresponds to the resistive voltage drop, $V_{Rds\_on}$, across SR. The equivalent circuit during this period is illustrated in FIG. 10. At time t3, the current in SR is close to zero and the SR turns off (advantageously at zero current and zero voltage to minimize electrical stress on the components of the power converter). Period t3-t4 is preferably set to avoid any adverse effects of turn off ringing. Therefore it may be advantageous for the phase compensation to be inexact (e.g. slight undercompensation or overcompensation of phase) in order to provide periods t1-t2 and t3-t4.

To precisely capture the voltage drop on SR, the phase compensation network should be properly designed as will now be discussed in detail. Assuming the current through the SR is iLsr(s), the compensated voltage can be expressed as:

$$Ccs(s) = \frac{Isr(s) \cdot Rds \cdot (1 + s \cdot Lsr/Rds)}{1 + s \cdot Rcs \cdot Ccs}. \quad (1)$$

If $$Rcs \cdot Ccs = Lsr/Rds, \quad (2)$$

and $$Vcs(t1) = V_{rds\_on}(t1), \quad (3)$$

then $$Vcs(s) = Isr(s) \cdot Rds = V_{rds\_on}(s). \quad (4)$$

Figure 13:
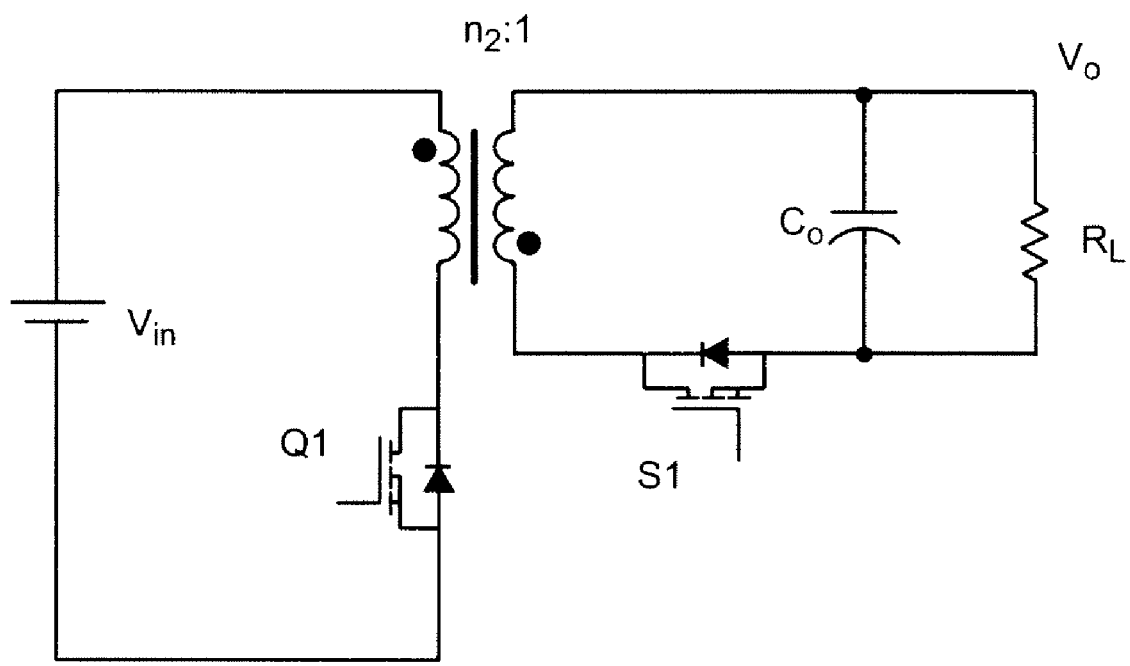
FIGS. 13 and 14 are schematic diagrams of exemplary non-resonant power converters to which the invention is also applicable.
Figure 14:
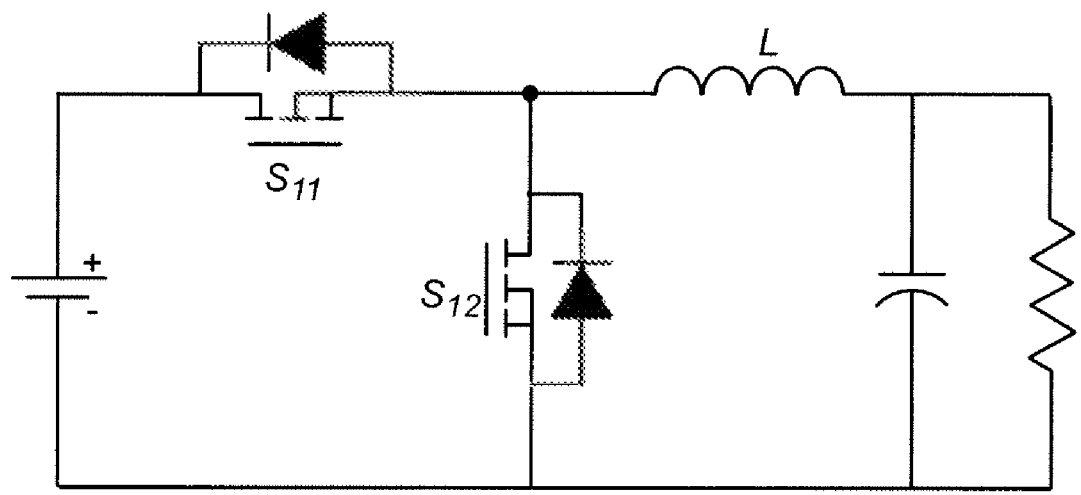

That is, the passive phase compensation network is preferably designed to satisfy equations (1), (2) and (4) while the active switches Sa and Sb are set to satisfy equation (3). As a result, the phase compensation network can precisely represent the voltage due to the on-resistance of the SR transistor/MOSFET but without the effects of package inductance included in Vd's. It should be noted that the proposed SR drive method and circuit can be extended in the same manner to other resonant converters and PWM converters, as well, including some non-resonant converters such as discontinuous mode (DCM) flyback converters and DCM buck converters as illustrated in FIGS. 13 and 14.

Figure 11:
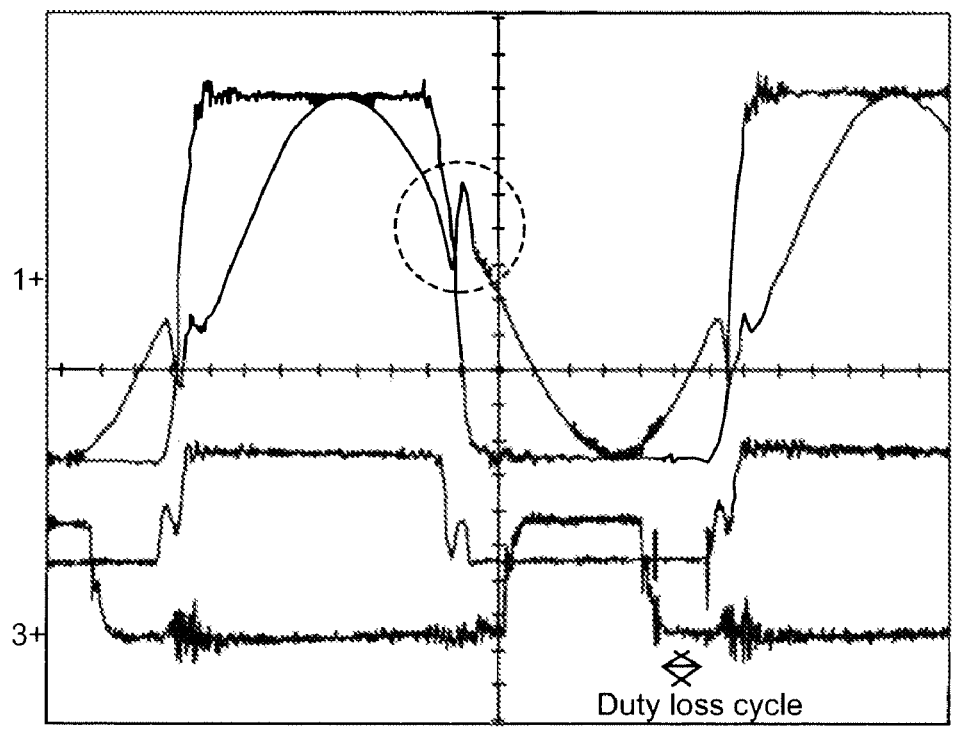
Figure 1:
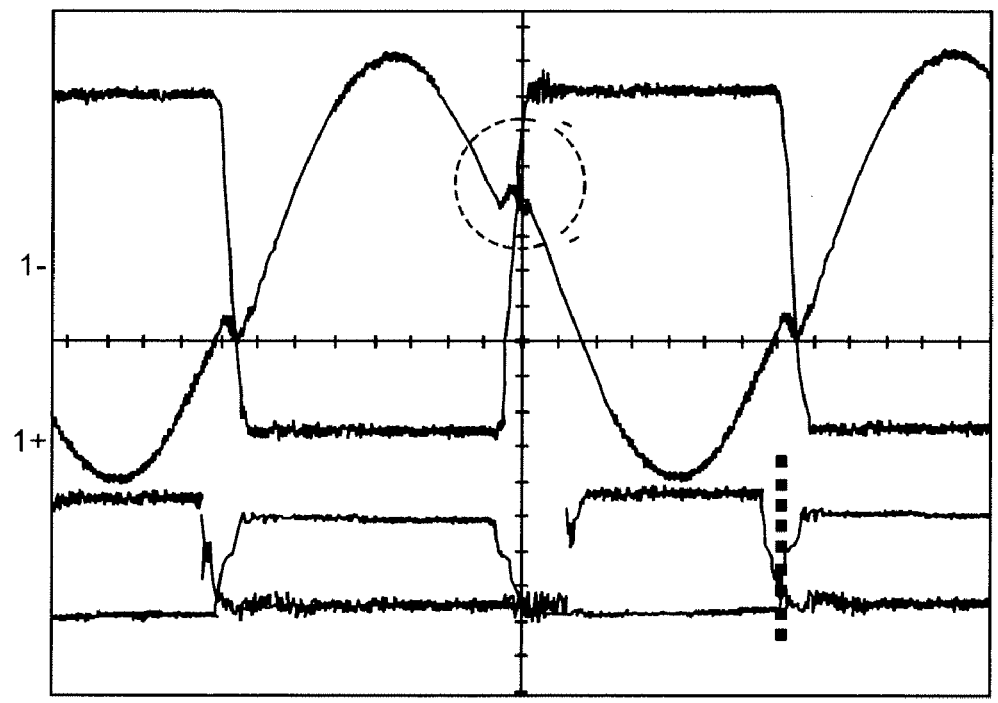

The SR driving scheme in accordance with the invention has been verified by experiment. As shown in FIG. 11, the synchronous rectifiers (SR) are driven by sensing the drain to source voltage across the SR but without phase compensation in accordance with the invention. The drive signal duty cycle loss is apparent since the zero crossing of Vd's (FIG. 3) is too early. Consequently, the body diode of the SR MOSFET will conduct for a significant period of time and the conduction loss will increase. Further, the reverse recovery problems compromise the performance of the SR.

In contrast, in FIG. 12, the synchronous rectifiers (SR) are driven with the phase compensation circuit of FIG. 6 (or an equivalent circuit thereof). The drive signal duty cycle loss is reduced to a vanishingly small duration and the body diode conduction loss is thus well-limited and the conduction loss is reduced. The reverse recovery problems are substantially eliminated. That is, in FIGS. 11 and 12, the current exhibits different characteristics. In FIG. 11, current glitches are evident when the primary side devices turn off. These current glitches are due to secondary side body diode reverse current, also referred to as reverse recovery current. In FIG. 12, the body diode conduction (glitch) is greatly reduced and, as a result, the body diode reverse current is not significant. The current waveform is very smooth and close to the ideal case. Improved efficiency is thus achieved. These experimental results also demonstrate that at least 1% efficiency improvement can be achieved for a prototype developed to deliver 1 kW operating at 1 MHZ with a 400V input and 48V output and a gain of up to over 3% has been observed in some cases. At the present state of the art which reflects substantial efforts over a substantial period of time to improve efficiency, a 1% gain in efficiency is highly significant and at an efficiency of about 92% for power converters corresponds to a reduction of overall losses of approximately 14% to 42%.

From the foregoing, it is clearly seen that the invention provides a technique to develop driving signals for synchronous rectifiers (replacing less efficient diode rectifiers) which is simple, avoids circuit complexity and consequent increased cost and size and which, by compensating for the phase change in measured or sensed current characteristics due to otherwise unavoidable package inductance, provides enhanced efficiency while limiting electrical stress on electrical components to improve reliability and robustness. These advantages over known SR drive schemes (which exhibit problematic and undesirable characteristics overcome by the invention) are achieved with minimal, if any, increase in circuit complexity over such known SR drive schemes which rely on direct current measurement or detection of current characteristics to develop drive signals for a synchronous rectifier.

While the invention has been described in terms of a single preferred embodiment, those skilled in the art will recognize that the invention can be practiced with modification within the spirit and scope of the appended claims.

The invention claimed is:

1. A power converter including
   a power stage including a synchronous rectifier controlling power to a load, and
   a drive arrangement for said synchronous rectifier, said drive arrangement including
      a phase compensation circuit developing a signal corresponding to a voltage drop across said synchronous rectifier from a voltage on a physical terminal of said synchronous rectifier; said voltage on said physical terminal of said synchronous rectifier including effects of package inductance of said synchronous rectifier which are not included in said voltage drop across said synchronous rectifier developed by said phase compensation circuit.

2. The power converter as recited in claim 1, wherein said synchronous rectifier includes a MOSFET.

3. The power converter as recited in claim 1, wherein said phase compensation circuit includes a series connection of a resistor and capacitor connected in parallel with said synchronous rectifier.

4. The power converter as recited in claim 3, wherein said phase compensation circuit is an active phase compensation circuit which includes switches for resetting said phase compensation circuit for switching cycles of said synchronous rectifier.

5. The power converter as recited in claim 1, wherein said phase compensation circuit is an active phase compensation circuit which includes switches for resetting said phase compensation circuit for switching cycles of said synchronous rectifier.

6. The power converter as recited in claim 1, wherein said power stage is a series resonant converter.

7. The power converter as recited in claim 1, wherein said power stage is an LLC resonant converter.

8. The power converter as recited in claim 1, wherein said power stage is a discontinuous mode flyback converter.

9. The power converter as recited in claim 1, wherein said power stage is a discontinuous mode buck converter.

10. An apparatus including, in combination,
    a circuit element functioning as a synchronous rectifier, and
    a phase compensation network connected in parallel with said circuit element and arranged to compensate for package inductance effects in a voltage waveform across said circuit element,
    wherein said circuit element is controlled in response to an output of said phase compensations circuit.

11. The apparatus as recited in claim 10, wherein said phase compensation network is responsive to a voltage appearing on physical terminals of said circuit element.

12. The apparatus as recited in claim 10, wherein said phase compensation network includes a resistor and a capacitor connected in series and in parallel with said circuit element.

13. The apparatus as recited in claim 12, wherein said phase compensation circuit is an active phase compensation circuit which includes switches for resetting said phase compensation circuit for switching cycles of said synchronous rectifier.

14. The apparatus as recited in claim 10, wherein said phase compensation circuit is an active phase compensation circuit which includes switches for resetting said phase compensation circuit for switching cycles of said synchronous rectifier.

15. A method of controlling a synchronous rectifier, said method comprising steps of
    detecting a waveform across physical terminals of said synchronous rectifier,
    compensating phase of said waveform to provide a phase compensated waveform, and
    controlling conduction of said synchronous rectifier in accordance with said phase compensated waveform.

16. The method as recited in claim 15, including the further step of
    resetting a circuit which performs said compensating step.

17. The method as recited in claim 16, wherein said phase compensated waveform provides a period which avoids effects of turn-off ringing of said circuit.

18. The method as recited in claim 15, wherein said phase compensated waveform provides a period to assure full turn-on of said synchronous rectifier.

* * * * *